(12) United States Patent
Fukuoka et al.

(10) Patent No.: US 9,100,147 B2
(45) Date of Patent: Aug. 4, 2015

(54) BASE STATION, TERMINAL, RETRANSMISSION CONTROL METHOD, AND RESPONSE METHOD

(75) Inventors: Masaru Fukuoka, Ishikawa (JP); Takashi Iwai, Ishikawa (JP); Akihiko Nishio, Kanagawa (JP); Daichi Imamura, Kanagawa (JP); Seigo Nakao, Kanagawa (JP); Sadaki Futagi, Ishikawa (JP); Tomofumi Takata, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 309 days.

(21) Appl. No.: 13/521,550

(22) PCT Filed: Jan. 28, 2011

(86) PCT No.: PCT/JP2011/000483
§ 371 (c)(1),
(2), (4) Date: Jul. 11, 2012

(87) PCT Pub. No.: WO2011/093096
PCT Pub. Date: Aug. 4, 2011

(65) Prior Publication Data
US 2012/0287886 A1 Nov. 15, 2012

(30) Foreign Application Priority Data
Jan. 29, 2010 (JP) .................... 2010-018715

(51) Int. Cl.
*H04W 72/02* (2009.01)
*H04L 5/00* (2006.01)
(Continued)

(52) U.S. Cl.
CPC .............. *H04L 5/003* (2013.01); *H04L 1/1893* (2013.01); *H04L 5/001* (2013.01); *H04L 5/0007* (2013.01); *H04W 28/04* (2013.01); *H04W 28/048* (2013.01); *H04W 72/02* (2013.01); *H04W 88/08* (2013.01)

(58) Field of Classification Search
None
See application file for complete search history.

(56) References Cited

U.S. PATENT DOCUMENTS

2008/0043880 A1* 2/2008 Matsushita ................... 375/296
2009/0325504 A1 12/2009 Aiba et al.

FOREIGN PATENT DOCUMENTS

CN 101088240 A 12/2007
CN 101682914 A 3/2010
(Continued)

OTHER PUBLICATIONS

3GPP TS 36.213 V8.7.0 (May 2009), 10.1 US procedure for determining physical uplink control channel assignment.
(Continued)

*Primary Examiner* — Jae Y Lee
*Assistant Examiner* — Alan Lindenbaum
(74) *Attorney, Agent, or Firm* — Pearne & Gordon LLP

(57) ABSTRACT

Disclosed is a base station which can prevent degradation in the reception characteristics of nearby cells when carrier aggregation and channel selection are applied. In accordance with the resistance to interference of a plurality of uplink component carriers of a femtocell, a response protocol controller (101) in a base station (100) changes combination rules for the uplink component carriers and signal points which a terminal (200) in a microcell covered by the base station (100) uses in the feedback of a response signal. Information in relation to the combination rules is notified to the terminal (200). A controller (217) in the terminal (200) changes the combination rules for the uplink component carriers and the signal points of the microcell covered by the base station (100) in accordance with the information notified from the base station (100), and controls transmission of the response signal in accordance with said rules.

11 Claims, 19 Drawing Sheets

(51) Int. Cl.
*H04L 1/18* (2006.01)
*H04W 28/04* (2009.01)
*H04W 88/08* (2009.01)

(56) References Cited

FOREIGN PATENT DOCUMENTS

| CN | 101692738 A | 4/2010 |
|---|---|---|
| CN | 101695177 A | 4/2010 |
| CN | 101695178 A | 4/2010 |
| WO | 2006/070551 A1 | 7/2006 |
| WO | 2008/149979 A1 | 12/2008 |

OTHER PUBLICATIONS

International Search Report for PCT/JP2011/000483 dated Mar. 8, 2011.

* cited by examiner

| FLAG# | 0 | 1 |
|---|---|---|
| TRANSMISSION USING CC#0 | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK | CONSTELLATION OF BPSK<br><br>CC#0 DTX, CC#1 NACK<br>CC#0 NACK(DTX), CC#1 ACK |
| TRANSMISSION USING CC#1 | CONSTELLATION OF BPSK<br><br>CC#0 DTX, CC#1 NACK<br>CC#0 NACK(DTX), CC#1 ACK | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK |

FIG.8

| STANDARD OF JUDGEMENT | Pmax FOR CC#0 > Pmax FOR CC#1 | Pmax FOR CC#0 > Pmax FOR CC#1 |
|---|---|---|
| TRANSMISSION USING CC#0 | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK<br>CC#0 NACK(DTX), CC#1 ACK | CONSTELLATION OF BPSK<br><br>CC#0 DTX, CC#1 NACK<br>CC#0 NACK(DTX), CC#1 ACK |
| TRANSMISSION USING CC#1 | CONSTELLATION OF BPSK<br><br>CC#0 DTX, CC#1 NACK<br>CC#0 NACK(DTX), CC#1 ACK | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK |

FIG.10

| STANDARD OF JUDGEMENT | PHR FOR CC#0 > PHR FOR CC#1 | PHR FOR CC#0 > PHR FOR CC#1 |
|---|---|---|
| TRANSMISSION USING CC#0 | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK | CONSTELLATION OF BPSK<br><br>CC#0 DTX, CC#1 NACK<br>CC#0 NACK(DTX), CC#1 ACK |
| TRANSMISSION USING CC#1 | CONSTELLATION OF BPSK<br><br>CC#0 DTX, CC#1 NACK<br>CC#0 NACK(DTX), CC#1 ACK | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK |

FIG.12

| STANDARD OF JUDGEMENT | NUMBER OF RETRANSMISSIONS USING CC#0 > NUMBER OF RETRANSMISSIONS USING CC#1 | NUMBER OF RETRANSMISSIONS USING CC#0 > NUMBER OF RETRANSMISSIONS USING CC#1 |
|---|---|---|
| TRANSMISSION USING CC#0 | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK | CONSTELLATION OF BPSK<br><br>CC#0 DTX, CC#1 NACK<br>CC#0 NACK(DTX), CC#1 ACK |
| TRANSMISSION USING CC#1 | CONSTELLATION OF BPSK<br><br>CC#0 DTX, CC#1 NACK<br>CC#0 NACK(DTX), CC#1 ACK | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK |

FIG.16

| STANDARD OF JUDGEMENT | MCS LEVEL OF CONTROL CHANNEL OF CC#0 < MCS LEVEL OF CONTROL CHANNEL OF #1 | MCS LEVEL OF CONTROL CHANNEL OF CC#0 < MCS LEVEL OF CONTROL CHANNEL OF #1 |
|---|---|---|
| TRANSMISSION USING CC#0 | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK | CONSTELLATION OF BPSK<br><br>CC#0 DTX, CC#1 NACK<br>CC#0 NACK(DTX), CC#1 ACK |
| TRANSMISSION USING CC#1 | CONSTELLATION OF BPSK<br><br>CC#0 DTX, CC#1 NACK<br>CC#0 NACK(DTX), CC#1 ACK | CONSTELLATION SIMILAR TO QPSK<br><br>CC#0 NACK, CC#1 NACK(DTX)<br>CC#0 ACK, CC#1 NACK(DTX)<br>CC#0 ACK, CC#1 ACK |

FIG.17

| PDCCH FORMAT | NUMBER OF CCES | NUMBER OF RESOURCE-ELEMENT GROUPS | NUMBER OF PDCCH BITS |
|---|---|---|---|
| 0 | 1 | 9 | 72 |
| 1 | 2 | 18 | 144 |
| 2 | 4 | 36 | 288 |
| 3 | 8 | 72 | 576 |

FIG.18

BASE STATION, TERMINAL, RETRANSMISSION CONTROL METHOD, AND RESPONSE METHOD

TECHNICAL FIELD

The present invention relates to base stations, terminals, retransmission control methods, and response methods.

BACKGROUND ART

In LTE-Advanced under standardization developed by the 3GPP, carrier aggregation is now being studied in which a transmission band is divided into component carriers (CCs), uplink or downlink packets are transmitted every CC, and some coordination is made among CCs. A downlink component carrier may be defined as a band obtained by division of a frequency band based on downlink frequency band information in a BCH broadcasted from a base station or as a band defined by a discrete width in the case where a downlink control channel (PDCCH) is discretely allocated in the frequency domain. An uplink component carrier may be defined as a band divided by uplink frequency band information in a BCH broadcasted from a base station or as a base unit of a communication band of 20 MHz or less having a physical uplink shared channel (PUSCH) domain in the center and having pieces of a PUCCH for LTE at the both ends.

The component carrier may be defined by a physical cell number or a carrier frequency number, and is also called a cell.

LTE and LTE-Advanced employ single carrier (SC)-FDMA as an uplink transmission scheme. In SC-FDMA, a transmission waveform by an individual user has single-carrier characteristics. For this reason, SC-FDMA can maintain cubic metric (CM)/PARP low. Furthermore, SC-FDMA has characteristics of orthogonal frequency division multiplexing. SC-FDMA thus can employ frequency division multiplexing (FDM) as a multiplexing method to frequency-division multiplex pieces of data in adjacent subcarriers at the same time, the data being to be transmitted to a plurality of users.

LTE and LTE-Advanced employ hybrid automatic repeat request (H-ARQ) to improve the efficiency of the transmission rate of downlink packets. When H-ARQ is employed in transmission of downlink packets, an uplink control channel (PUCCH) is used as a response channel for transmitting from a terminal to a base station an ACK or a NACK that indicates whether a downlink packet is successfully received or not received as a feedback.

In LTE in which communication is made using CC pairs each formed of an uplink CC and a downlink CC, downlink packets are transmitted in one downlink CC and a response signal is transmitted in a PUCCH of an uplink CC corresponding to the downlink CC.

When this scheme for LTE is applied to LTE-Advanced in which downlink packets are concurrently transmitted using a plurality of downlink CCs, response signals are transmitted using a plurality of uplink CCs. Transmitting a response signal by SC-FDMA in this situation causes the single-carrier characteristics of SC-FDMA to be lost. For this reason, cubic metric (CM)/peak-to-average power ratio (PAPR) increases (see FIG. 1), consequently causing the transmission waveform to be distorted. To prevent this distortion, it may be possible to cut off an amount of transmission power to be amplified, which, however impairs required reception quality.

To overcome this problem, i.e. to prevent the response signals from being transmitted concurrently in PUCCHs of a plurality of CCs, a channel selection technique has been suggested. The channel selection is a technique in which one response signal is transmitted by changing a combination of an uplink CC and constellation points (points on the constellation) according to a pattern about successful reception of each of downlink packets that have been transmitted using a plurality of downlink CCs, the uplink CCs and constellation points being used to transmit a response signal (see Non-Patent Literature 1). That is, information about ACKs or NACKs for a plurality of transmitted downlink packets are combined and one response signal is transmitted as a feedback in a PUCCH of one CC (see FIGS. 2 and 3). Here, "CC#1 DTX" in FIG. 3 refers to the case where a terminal fails to receive downlink control information for reporting to the terminal that DL#1 has been transmitted (i.e. downlink control information required for the terminal to receive DL#1 and is transmitted prior to DL#0).

CITATION LIST

Non-Patent Literature

NPL 1
3GPP TS 36.213 V8.7.0 10.1 UE procedure for determining physical uplink control channel assignment

SUMMARY OF INVENTION

Technical Problem

Meanwhile, a heterogeneous network is being studied as a system in which a plurality of cells having different cell radiuses and accommodating a different number of UEs are flexibly arranged. In the heterogeneous network, a macrocell having a large cell radius (macrocell) and a femtocell having a small cell radius are provided (see FIG. 4). The above LTE and LTE-Advanced systems are applied to both of the macrocells and femtocells.

To adaptively control interference power toward uplink channels of the femtocell, it may be possible to control transmission power of terminals (UEs) covered by the macrocell for every CC. That is, by taking into consideration the situation of femtocell, it may be possible to control the transmission power of terminals (UEs) covered by the macrocell so that interference power from the macrocell to the femtocell does not become a predetermined value or more in a certain uplink CC. By this means, by suppressing transmission power for some CCs among a plurality of CCs, interference power toward the femtocell can be reduced while reception characteristics of other terminals covered by the macrocell can be maintained. As a result, CCs in the femtocell receive a different amount of interference. In this case, a communication scheme having lower interference robustness can be employed in CCs receiving smaller interference than in CCs receiving greater interference (see FIG. 4). That is, in the case where BPSK is used in the modulation scheme for CCs receiving large interference, QPSK, which has low interference robustness but providing a large transmission rate, can be used in CCs receiving small interference.

Here, regarding the constellations used in the channel selection shown in FIG. 3, the first CC employs a constellation similar to QPSK (corresponding to three constellation points out of four constellation points in the QPSK constellation) and the second CC employs a constellation of BPSK.

Accordingly, in the case where two CCs, CC#0 and CC#1, are used in the channel selection, the following two patterns of combination of a CC and a constellation may be employed: the first pattern for associating the constellation similar to QPSK and the constellation of BPSK with CC#0 and CC#1, respectively, and the second pattern for associating the constellation of BPSK and the constellation similar to QPSK with CC#0 and CC#1, respectively. Generally, when transmission power of a signal transmitted in a CC associated with the constellation similar to QPSK is compared with that of a signal transmitted using a CC associated with the constellation of BPSK, the transmission power of the signal transmitted using the CC associated with the constellation similar to QPSK is higher than that of the signal transmitted using the CC associated with the constellation of BPSK to meet the required quality.

For this reason, depending on the combination of a communication scheme used in an uplink CC of a femtocell and a communication scheme used in an uplink CC of a macrocell that corresponds to the uplink CC of the femtocell, interference from the macrocell to the femtocell becomes too large to be ignored, thus causing deterioration of reception characteristics in the femtocell.

It is therefore an object of the present invention to provide a base station, a terminal, a retransmission control method, and a response method that can prevent deterioration of reception characteristics of neighboring cells in the case where carrier aggregation and channel selection are employed.

Solution to Problem

One aspect of a base station of the present invention includes: a control section that changes a rule for combination of a component carrier and constellation points based on a parameter related to interference robustness of a plurality of component carriers in a plurality of cells, the component carrier and the constellation points being to be used by a terminal to transmit a response signal as a feedback to downlink data that has been transmitted using the plurality of component carriers; a reception section that performs a reception process using a combination of a candidate component carrier and candidate constellation points and outputs a result of the reception process, the candidate component carrier and the candidate constellation points corresponding to information about the changed combination rule; and an identification section that identifies the combination of the candidate component carrier and the candidate constellation points based on the result of the reception process, the candidate component carrier and the candidate constellation points having been used to transmit the response signal as a feedback.

One aspect of a terminal of the present invention includes: a reception section that receives downlink data using a plurality of component carriers; a control section that changes a rule for combination of a component. carrier and constellation points that are to be used to transmit a response signal as a feedback to the downlink data that has been transmitted using the component carriers; and a transmission section that transmits the response signal to a base station based on the changed combination rule; wherein the control section changes the combination rule based on information indicating the combination rule or based on a parameter related to interference robustness of the component carriers in a plurality of cells, the information indicating the combination rule being determined by the base station based on the interference robustness of the component carriers.

One aspect of a retransmission control method of the present invention includes: changing a rule for combination of a component carrier and constellation points based on a parameter related to interference robustness of a plurality of component carriers in a plurality of cells, the component carrier and the constellation points being to be used by a terminal to transmit a response signal as a feedback to downlink data that has been transmitted using the component carriers; performing a reception process using a combination of a candidate component carrier and candidate constellation points, the candidate component carrier and the candidate constellation points corresponding to information about the changed combination rule; and identifying the combination of the candidate component carrier and the candidate constellation points based on the result of the reception process, the candidate component carrier and the candidate constellation points having been used to transmit the response signal as a feedback.

One aspect of a response method of the present invention includes: changing a rule for combination of a component carrier and constellation points that are to be used to transmit a response signal as a feedback to downlink data that has been transmitted using a plurality of component carriers; and transmitting the response signal to a base station based on the changed combination rule; wherein the combination rule is changed based on information indicating the combination rule or based on a parameter related to interference robustness of the component carriers in a plurality of cells, the information indicating the combination rule being determined by the base station based on the interference robustness of the component carriers.

Advantageous Effects of Invention

According to the present invention, it is possible to provide a base station, a terminal, a retransmission control method, and a response method that can prevent deterioration of reception characteristics of neighboring cells in the case where carrier aggregation and channel selection are employed.

BRIEF DESCRIPTION OF DRAWINGS

FIG. 8 shows operations of a base station and a terminal.;
FIG. 10 shows operations of a base station and a terminal according to Embodiment 2 of the present invention;
FIG. 12 shows operations of a base station and a terminal according to Embodiment 3 of the present invention.

FIG. 16 shows operations of a base station and a terminal;
FIG. 17 shows operations of a base station and a terminal;
FIG. 18 shows operations of a base station and a terminal.

DESCRIPTION OF EMBODIMENTS

Figure 1:
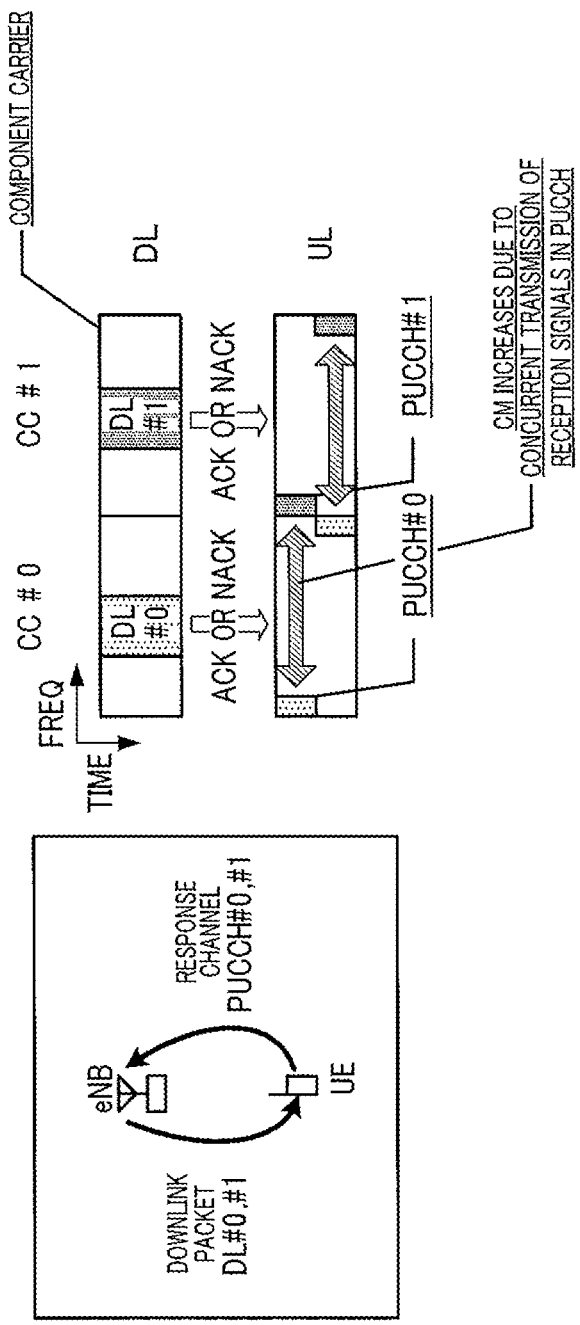
FIG. 1 shows a problem in a conventional system.
Figure 2:
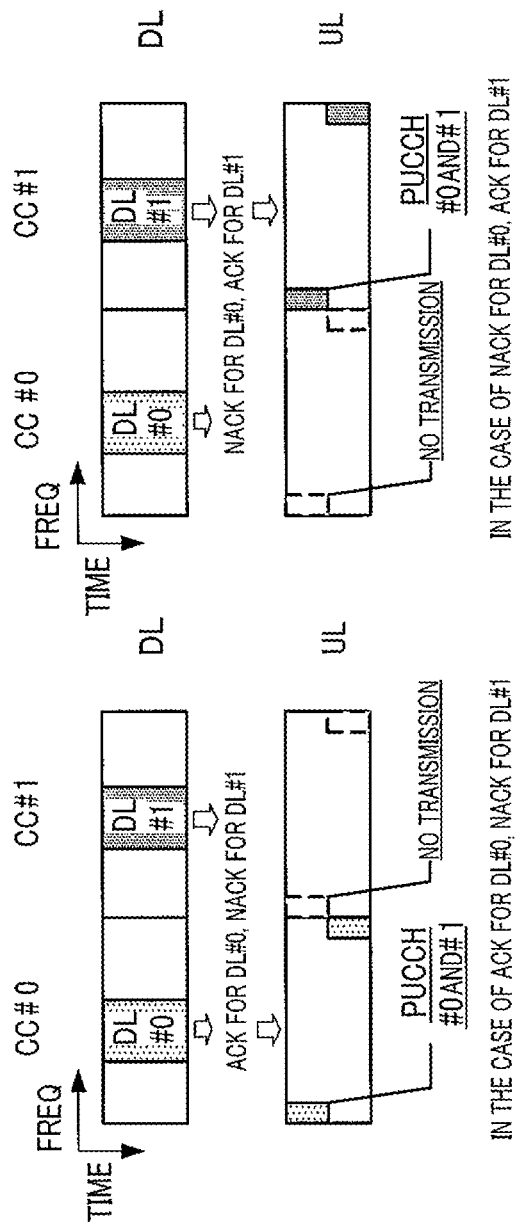
FIG. 2 shows a channel selection technique.
Figure 3:
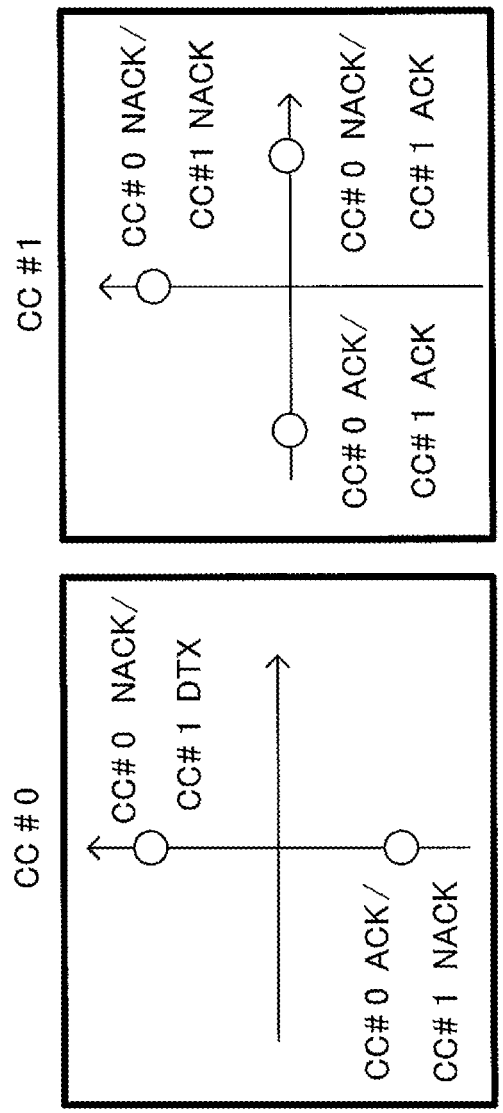
FIG. 3 shows a channel selection technique.
Figure 4:
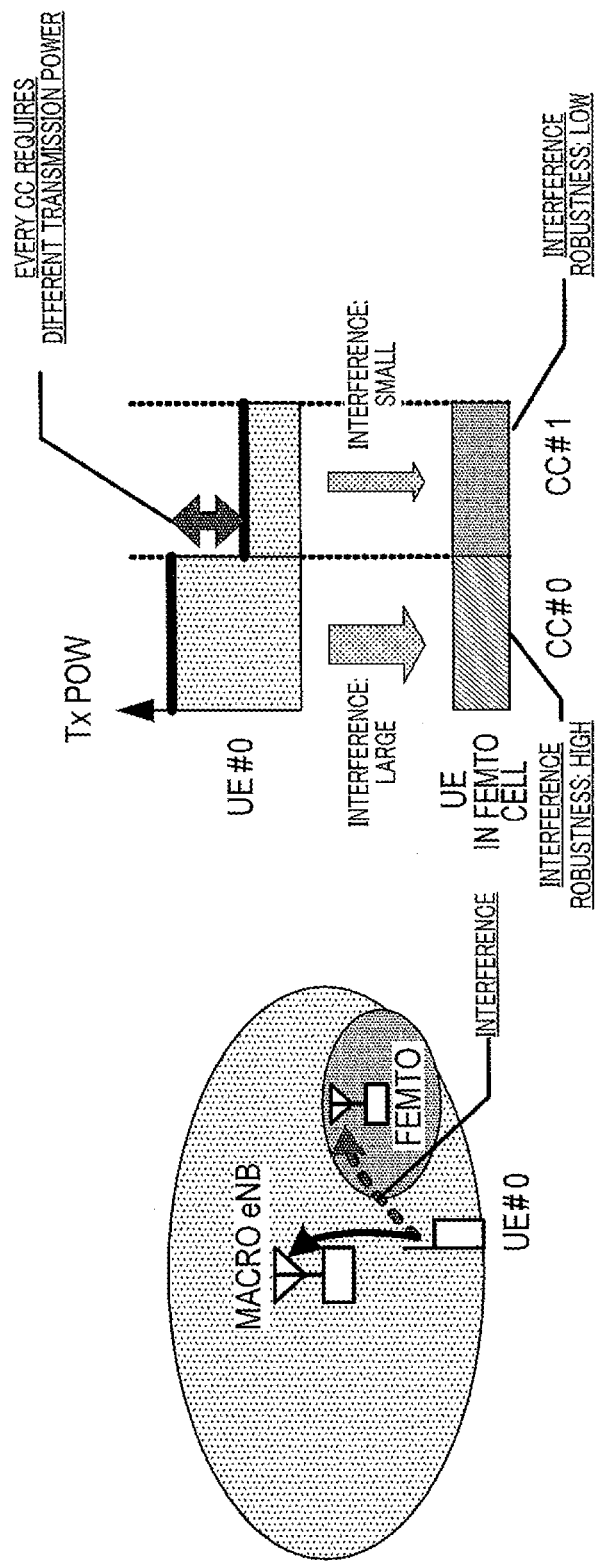
FIG. 4 shows a heterogeneous network.

Now, embodiments of the present invention will be described in detail with reference to the accompanying drawings. However, components having the same functions in the embodiments will be assigned the same reference numerals, and overlapping explanations will be omitted.

[Embodiment 1]
[Overview of System]

In a communication system including base station 100 and terminals 200, which will be described later, communication employing carrier aggregation is performed in which a plurality of uplink component carriers and a plurality of component carriers associated with the uplink component carriers are used.

When communication is performed using the carrier aggregation in this communication system, the channel selection is employed in ARQ. That is, this communication system is an LTE-A system, base station 100 is an LTE-A base station, and terminal 200 is an LTE-A terminal, for example.

Hereinafter, a case will be described as an example, in which two component carriers are used (i.e. a case where component carriers #1 and #2 are used).

[Configuration of Base Station]

Figure 5:
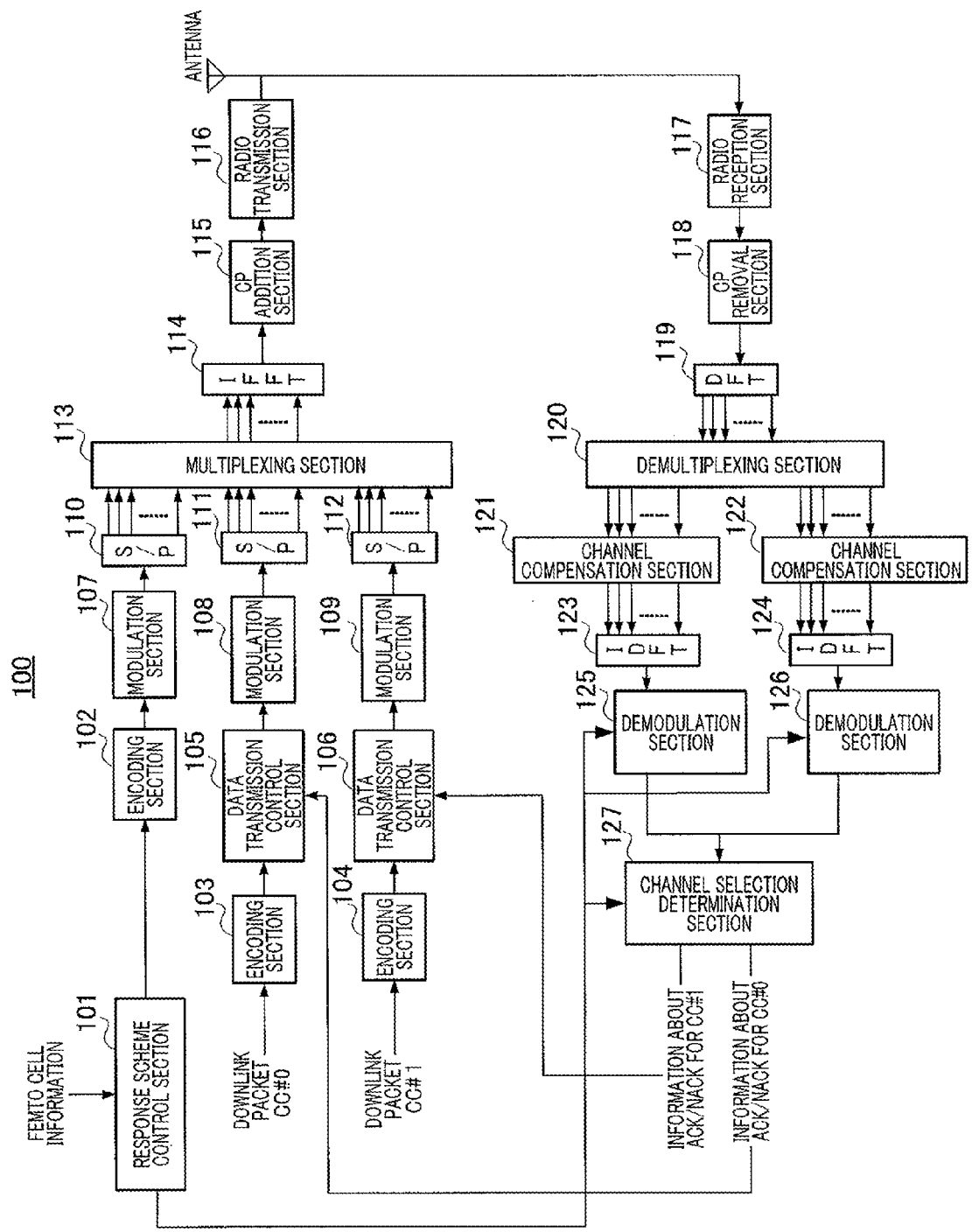
FIG. 5 is a block diagram showing a configuration of a base station according to Embodiment 1 of the present invention.

FIG. 5 is a block diagram showing a configuration of base station 100 according to Embodiment 1 of the present invention. With reference to FIG. 5, base station 100 includes response scheme control section 101, encoding sections 102, 103, and 104, data transmission control sections 105 and 106, modulation sections 107, 108, and 109, serial-to-parallel conversion sections (S/Ps) 110, 111, and 112, multiplexing section 113, IFFT section 114, CP addition section 115, radio transmission section 116, radio reception section 117, CP removal section 118, DFT section. 119, demultiplexing section 120, channel compensation sections 121 and 122, IDFT sections 123 and 124, demodulation sections 125 and 126, and channel selection determination section 127.

Response scheme control section 101 determines a rule for combination of an uplink component carrier and constellation points, and outputs information indicating the determined rule to encoding section 102. Here, the uplink component carrier and the constellation points are used by terminal 200 to transmit a response signal as a feedback to downlink data that has been transmitted from base station 100 using a plurality of downlink component carriers. Response scheme control section 101 determines the above combination rule based on femtocell information to be input, which contains information indicating interference robustness of a plurality of uplink component carriers used by a femtocell. The femtocell is a cell adjacent to a macrocell covered by base station 100 or a cell that is smaller than that macrocell and is contained in the macrocell. The above combination rule will be described in detail later.

Encoding section 102 receives as input downlink control data including information indicating the above combination rule, and performs an encoding process (e.g. turbo encoding or convolutional encoding) on and adds a CRC bit for retransmission control to the received data. The data that has undergone the encoding process and the addition of the CRC bit is modulated in modulation section 107.

Encoding section 103 receives as input transmission data (a packet) to be transmitted using component carrier #0, and performs an encoding process (e.g. turbo encoding or convolutional encoding) on and adds a CRC bit for retransmission control to the transmission data. The data that has undergone the encoding process and the addition of the CRC bit is output to data transmission control section 105.

Encoding section 104 receives as input transmission data (a packet) to be transmitted using component carrier #1, and performs an encoding process (e.g. turbo encoding or convolutional encoding) on and adds a CRC bit for retransmission control to the transmission data. The data that has undergone the encoding process and the addition of the CRC bit is output to data transmission control section 106.

Data transmission control section 105 maintains and outputs the encoded transmission data for CC#0 to modulation section 108, at the initial transmission. The encoded transmission data is maintained for every destination terminal 200.

Upon receiving from channel selection determination section 127 a NACK or a DTX for downlink data that has been transmitted using CC#0, data transmission control section 105 outputs the maintained data corresponding to this CC#0 to modulation section 108. Upon receiving from channel selection determination section 127 an ACK for the downlink data that has been transmitted using CC#0, data transmission control section 105 deletes the maintained data corresponding to this CC#0.

Data transmission control section 106 performs the same process as data transmission control section 103 on the data to be transmitted using CC#1.

The process in data transmission control section 105 and data transmission control section 106 makes it possible to control. retransmission not only for the entire data that has been transmitted to destination terminal 200 but also for data that has been transmitted using every component carrier.

Modulation sections 108 and 109 modulate transmission data received from transmission control sections 105 and 106, respectively. By so doing, modulation signals to be transmitted using CC#0 and CC#1 are generated.

As described above, because the modulation signals generated in modulation sections 107, 108, and 109 will be transmitted as OFDM signals, the modulation signals undergo processes in serial-to-parallel conversion sections 110, 111, and 112, multiplexing section 113, IFFT section 114, and CP addition section 115, as will be described later.

Serial-to-parallel conversion section 110 performs serial-to-parallel conversion on the modulation signal generated in modulation section 107 and outputs a group of the obtained parallel signals to multiplexing section 113. Serial-to-parallel conversion sections 111 and 112 perform the same process as serial-to-parallel conversion section 110 on the modulation signals generated in modulation sections 108 and 109.

Multiplexing section 113 multiplexes signals received from serial-to-parallel conversion sections 110, 111, and 112 (i.e. multiplexing section 113 multiplexes a packet to be transmitted using downlink CC#0, a packet to be transmitted using downlink CC#1, and the control channel).

IFFT section 114 converts the signals from frequency domain signals into time domain signals by performing an IFFT process on the signals multiplexed in multiplexing section 113, to generate an OFDM symbol.

CP addition section 115 adds the end section of the OFDM symbol obtained in IFFT section 114 as a CP to the heading of the OFDM symbol.

Radio transmission section 116 performs a radio transmission process (e.g. D/A conversion and up-conversion) on the OFDM signal received from CP addition section 115, and transmits the radio transmission-processed OFDM signal via an antenna.

Radio reception section 117 performs a radio reception process (e.g. down-conversion and A/D conversion) on the signal received via the antenna.

CP removal section 118 removes a CP from a reception signal that has undergone the radio reception process.

DFT section 119 performs a DFT process on the signal without the CP to convert the reception signal into a frequency domain signal.

Demultiplexing section 120 extracts a signal corresponding to a PUCCH resource domain of every uplink CC from the reception signal received from DFT section 119. Here, because uplink CC#0 and uplink CC#1 are used in this embodiment, demultiplexing section 120 extracts a signal corresponding to the PUCCH resource domain of uplink CC#0 from the reception signal received from DFT section 119 and outputs the extracted signal to channel compensation section 121, and demultiplexing section 120 extracts a signal corresponding to the PUCCH resource domain of uplink CC#1 from the reception signal received from DFT section 119 and outputs the extracted signal to channel compensation section 122.

Channel compensation sections 121 and 122 extract a pilot symbol from the signal received from demultiplexing section 120 and perform a frequency domain equalization process using the pilot symbol.

IDFT sections 123 and 124 convert the signal that has undergone the channel compensation from the frequency domain signal into the time domain signal.

Demodulation sections 125 and 126 perform a demodulation process on the input signal based on the combination rule determined in response scheme control section 101.

Channel selection determination section 127 determines results of error detection (i.e. ACK or NACK) for pieces of downlink data that have been transmitted using downlink CC#0 and downlink CC#1 based on the demodulated signals corresponding to the respective uplink CCs that are obtained in demodulation section 125 and demodulation section 126 and based on the combination rule determined in response scheme control section 101.

[Configuration of Terminal]

Figure 6:
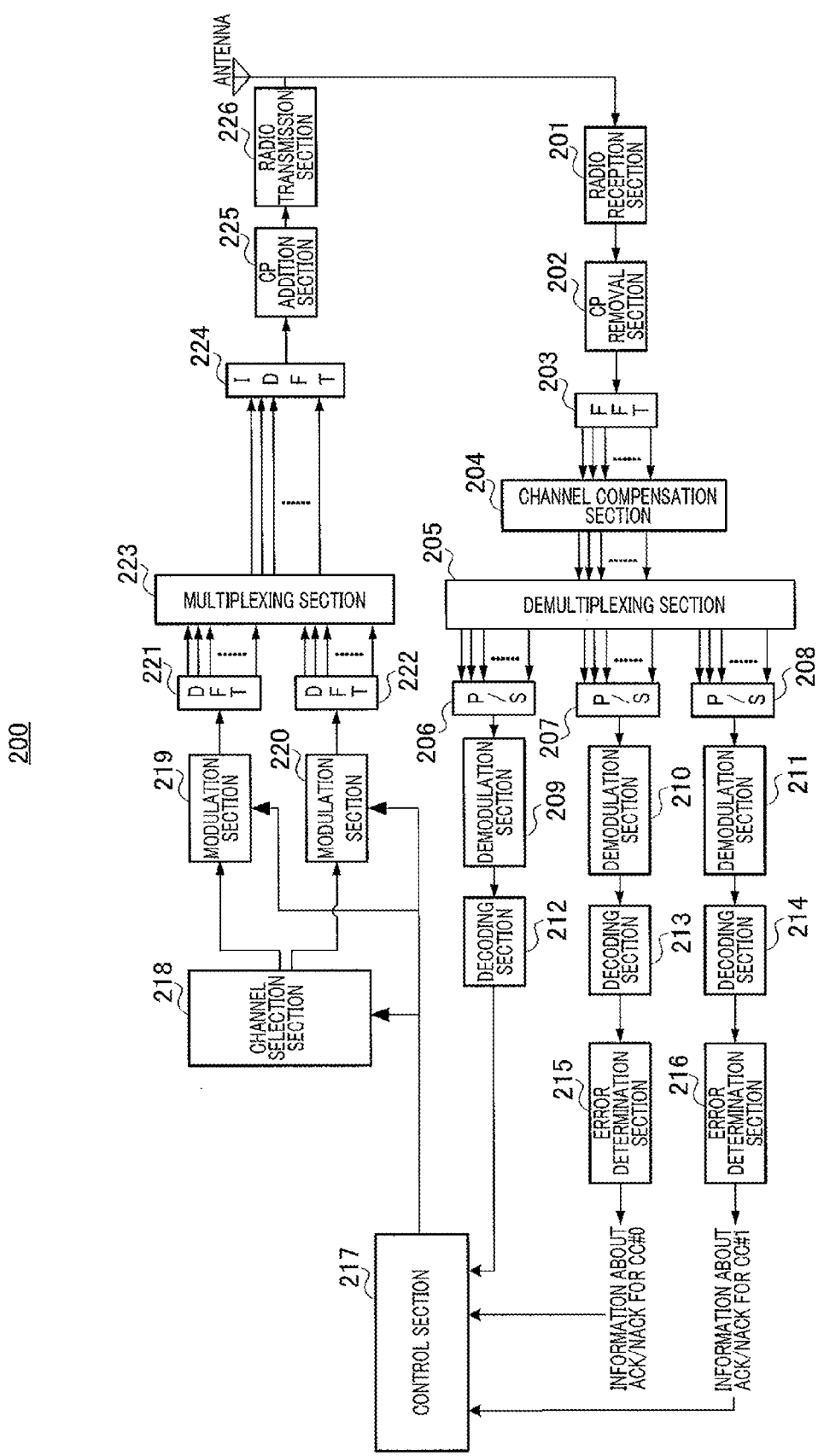
FIG. 6 is a block diagram showing a configuration of a terminal according to Embodiment 1 of the present invention.

FIG. 6 is a block diagram showing a configuration of terminal 200 according to Embodiment 1 of the present invention. With reference to FIG. 6, terminal 200 includes radio reception section 201, CP removal section 202, FFT section 203, channel compensation section 204, demultiplexing section 205, parallel-to-serial conversion sections (P/Ss) 206, 207, and 208, demodulation sections 209, 210, and 211, decoding sections 212, 213, and 214, error determination sections 215 and 216, control section 217, channel selection section 218, modulation sections 219 and 220, DFT sections 221 and 222, multiplexing section 223, IDFT section 224, CP addition section 225, and radio transmission section 226.

Radio reception section 201 performs a radio reception process (e.g. down-conversion and A/D conversion) on a signal received via an antenna.

CP removal section 202 removes a CP from the reception signal that has undergone the radio reception process.

FFT section 203 performs an FFT process on the signal without the CP to convert the reception signal into a frequency domain signal.

Channel compensation section 204 extracts a pilot symbol from the signal received from FFT section 203 and performs a frequency domain equalization process using the pilot symbol.

Demultiplexing section 205 extracts a downlink control channel and reception symbols of the respective downlink CCs from the reception signal received from channel compensation section 204. Here, because downlink CC#0 and downlink CC#1 are used in this embodiment, demultiplexing section 205 extracts a reception symbol of downlink CC#0 from the reception signal received from channel compensation section 204 and outputs the extracted reception symbol to parallel-to-serial conversion section 207, and demultiplexing section 205 extracts a reception symbol of downlink CC#1 from the reception signal received from channel compensation section 204 and outputs the extracted reception symbol to parallel-to-serial conversion section 208. Furthermore, demultiplexing section. 205 extracts the downlink control channel from the reception signal received from channel compensation section 204 and outputs the extracted downlink control channel to parallel-to-serial conversion section 206.

Parallel-to-serial conversion section 206 performs parallel-to-serial conversion on the downlink control channel received from demultiplexing section 205 and outputs the obtained serial signal to demodulation section 209. Parallel-to-serial conversion sections 207 and 208 perform the same process as parallel-to-serial conversion section 206 on the reception signals of downlink CC#0 and downlink CC#1 that are received from demultiplexing section 205.

Demodulation sections 209, 210, and 211 perform a demodulation process on the signals received from parallel-to-serial conversion sections 206, 207, and 208, respectively.

Decoding section 212 performs error correction decoding (e.g. turbo encoding or Viterbi encoding) on the likelihood of reception bit obtained from the downlink control channel, which has been received from demodulation section 209. Decoding section 213 performs error correction decoding (e.g. turbo encoding or Viterbi encoding) on the reception bits of a downlink packet of downlink CC#0 before decoding, which has been received from demodulation section 210. Decoding section 214 performs error correction decoding (e.g. turbo encoding or Viterbi encoding) on the reception bits of a downlink packet of downlink CC#1. before decoding, which has been received from demodulation section 211.

Error determination section 215 determines whether or not the decoding result (i.e. decoding result of a downlink packet of downlink CC#0) obtained in decoding section 213 has errors. Error determination section 216 determines whether or not the decoding result (i.e. decoding result of a downlink packet of downlink CC#1) obtained in decoding section 214 has errors.

Control section 217 controls transmission of a response signal based on the error detection results for the downlink packet of downlink CC#0 and the downlink packet of downlink CC#1, and based on information about the combination rule contained in the downlink control channel which has been received from decoding section 212.

Specifically, control section 217 first selects a transmission rule for the response signal based on the information about the combination rule.

Next, control section 217 determines a combination of an uplink component carrier and constellation points that is to be used to transmit a response signal based on the selected transmission rule and based on the error detection result for the downlink packet of downlink CC#0 and the downlink packet of downlink CC#1 (i.e. pattern about whether or not downlink packets transmitted using downlink CC#0 and CC#1 are successfully received (pattern about successful reception)). Thus determined information about an uplink component carrier to be used to, transmit a response signal (uplink component carrier information) is output to channel selection section 218 while information about constellation points is output to modulation sections 219 and 220.

The process in this control section 217 will be described in detail later.

Channel selection section 218 outputs a response signal to either modulation section 219 or 220 that corresponds to the uplink component carrier indicated in the uplink component carrier information received from control section 217: upon receiving from control section 217 the uplink component carrier information indicating uplink CC#0, channel selection section 218 outputs a response signal to modulation section 219 while upon receiving from control section 217 the uplink component carrier information indicating uplink CC#1, channel selection section 218 outputs a response signal to modulation section 220.

Modulation sections 219 and 220 modulate the response signal using the constellation points indicated in the information received from control section 217.

DFT sections 221 and 222 perform a DFT process on the respective modulation signals received from modulation sections 219 and 220 to convert the respective modulation signals into frequency domain signals.

Multiplexing section 223 is configured to multiplex the signals received from DFT sections 221 and 222. However, multiplexing section 223 does not multiplex the signals, practically, because response signals will not be output from channel selection section 218 to both modulation sections 219 and 220 at the same time.

IDFT section 224 converts the signal from the frequency domain signal into the time domain signal by performing an IDFT process on the signal received from multiplexing section 223, to generate an OFDM symbol.

CP addition section 225 adds the end section of the OFDM symbol obtained in IDFT section 224 as a CP to the heading of the OFDM symbol.

Radio transmission section 226 performs a radio transmission process (e.g. D/A conversion and up-conversion) on the OFDM signal received from CP addition section 225, and transmits the radio transmission-processed OFDM signal via an antenna.

[Operation of Base Station and Terminal]

Next, a method of determining the above rule for combination of an uplink component carrier and constellation points in base station 100, and a method of setting the above transmission rule for a response signal in terminal 200 will be described.

As described above, in base station 100, response scheme control section 101. determines the rule for combination of an uplink component carrier and constellation points based on the femtocell information, the uplink component carrier and the constellation points being to be used by terminal 200 to transmit a response signal as a feedback.

Specifically, according to this combination rule, constellations having the same number as that of uplink component carriers to be used to transmit a response signal are provided. The above respective patterns about successful reception determined in terminal 200 are associated with any one of the constellation points of every constellation. Here, because uplink CC#0 and uplink CC#1 are used to transmit a response signal, two constellations are provided. The number of constellation points to be used to transmit a response signal in the first constellation is greater than the number of constellation points to be used to transmit a response signal in the second constellation, i.e., the M-ary modulation value corresponding to the first constellation is greater than the M-ary modulation value corresponding to the second constellation. Furthermore, the pattern about successful reception indicating that downlink packets using all component carriers have been successfully received is associated with any one of the constellation points contained in the first constellation.

Figure 7:
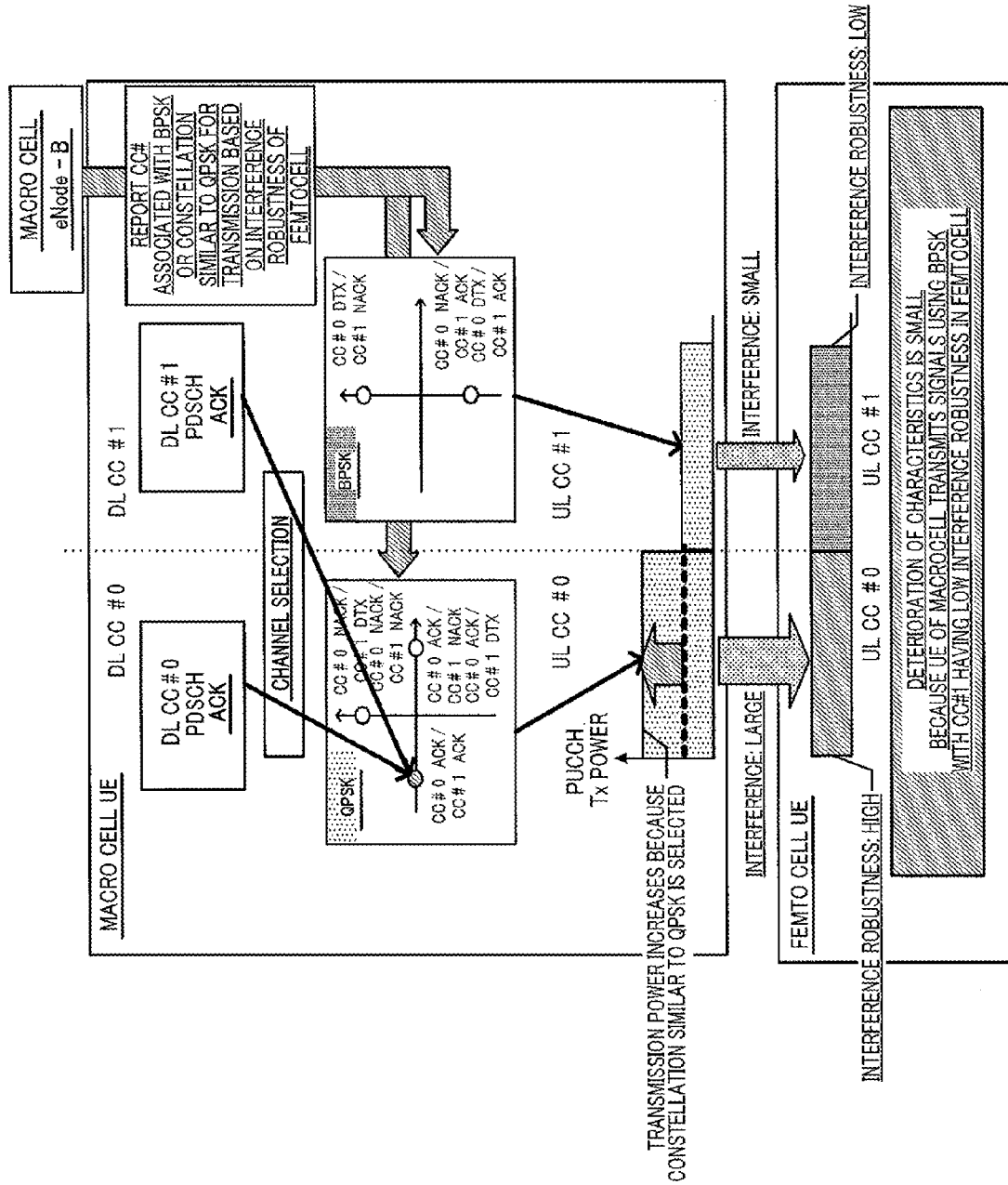
FIG. 7 shows operations of a base station and a terminal.

Response scheme control section 101 assigns the first constellation to uplink CC#0 and assigns the second constellation to uplink CC#1 when the femtocell information indicates that uplink CC#0 has higher interference robustness than uplink. CC#1 in a femtocell. That is, response scheme control section 101 assigns the first constellation to the component carrier of the femtocell with high interference robustness. With reference to FIG. 7, the constellation similar to QPSK is used for the first constellation and BPSK is used for the second constellation.

Base station 100 transmits to terminal 200 the information about the above combination rule determined in response scheme control section 101. Here, base station 100 and terminal 200 share in advance information about combination pattern of a component carrier and a constellation in which either CC#0 or CC#1 is associated with either the first constellation or the second constellation (see FIG. 8). Therefore, transmission of flag information corresponding to the combination pattern of a component carrier and a constellation to terminal 200 from base station 100 enables terminal 200 to transmit a response signal according to the rule indicated by base station 100.

Upon receiving the information about the above combination rule, terminal 200 sets a transmission rule corresponding to that combination rule, and transmits a response signal based on the transmission rule and the pattern about successful reception. This transmission rule is the same as the above combination rule.

As described above, according to the present embodiment, in base station 100, response scheme control section 101 changes the combination rule of an uplink component carrier and constellation points that are to be used by terminal 200 to transmit a response signal as a feedback, based on interference robustness of a plurality of uplink component carriers of femtocell, the terminal 200 being located in a macrocell covered by base station 100. Information about this combination rule is reported to terminal 200.

By this means, a constellation that can suppress a transmission power to a low level can be assigned to an uplink component carrier of the macrocell that corresponds to an uplink component carrier with low interference robustness in a femtocell, accordingly making it possible to reduce the interference to the femtocell.

Specifically, according to the above changed combination rule, the number of candidate constellation points contained in the first constellation associated with the first component carrier of the macrocell is greater than that in the second constellation associated with the second component carrier of the macrocell in the following case. Downlink data is transmitted using two downlink component carriers of the macrocell, and among two uplink component carriers of a femtocell corresponding to the two downlink component carriers of that macrocell, the first component carrier of the femtocell has higher interference robustness than the second component carrier of the femtocell.

Furthermore, the pattern about successful reception indicating that downlink packets of all component carriers have been successfully received is associated with any one of the constellation points contained in the first constellation. Here, ACK and NACK occur with an approximately ratio of ACK to NACK being 9:1. That is, the pattern about successful reception indicating that downlink packets of all component carriers have been successfully received is more likely to occur than other patterns about successful reception. For this reason, the second constellation is less likely to be used to transmit a response signal than the first constellation. That is, it is possible to reduce the probability of using an uplink component carrier of the macrocell corresponding to the uplink component carrier having low interference robustness in the femtocell, making it possible to reduce interference to the femtocell.

Furthermore, according to the present embodiment, in terminal 200, control section 217 changes the combination rule of an uplink component carrier of the macrocell covered by base station 100 and constellation points, based on the information reported from base station 100. In addition, according to the above changed rule, channel selection section 218 and modulation sections 219 and 220 transmit a response signal to base station 100 using one combination of an uplink component carrier of the macrocell and constellation points, the one combination corresponding to the pattern about successful reception of downlink data transmitted using a plurality of downlink component carriers.

Specifically, the above information reported from base station 100 is information about the combination rule of an uplink component carrier of the macrocell and constellation points, the information being determined by base station 100 based on the interference robustness of uplink component carriers of the femtocell.

[Embodiment 2]

Embodiment 2 employs the same configuration as Embodiment 1 in that a terminal changes the transmission rule of a response signal based on information reported from a base station. According to Embodiment 1, terminal 200 receives information about the combination rule of an uplink component carrier of the macrocell and constellation points and, based on that information, changes the transmission rule of a response signal, the information about the combination rule being determined by base station 100 based on the interference robustness of uplink component carriers of a femtocell. In contrast, according to Embodiment 2, a terminal changes the transmission rule of a response signal based on information about the maximum transmission power for every uplink component carrier of a macrocell, the information being transmitted from the base station. That is, according to Embodiment 2, the base station does not need to transmit information about the above combination rule to a terminal. For this reason, it is not necessary to set additional signaling in addition to the signaling set in the standard for the LTE system.

The basic configurations of a base station and terminals according to Embodiment 2, which are identical to those of Embodiment 1, will be described with reference to FIGS. 5 and 6.

Figure 9:
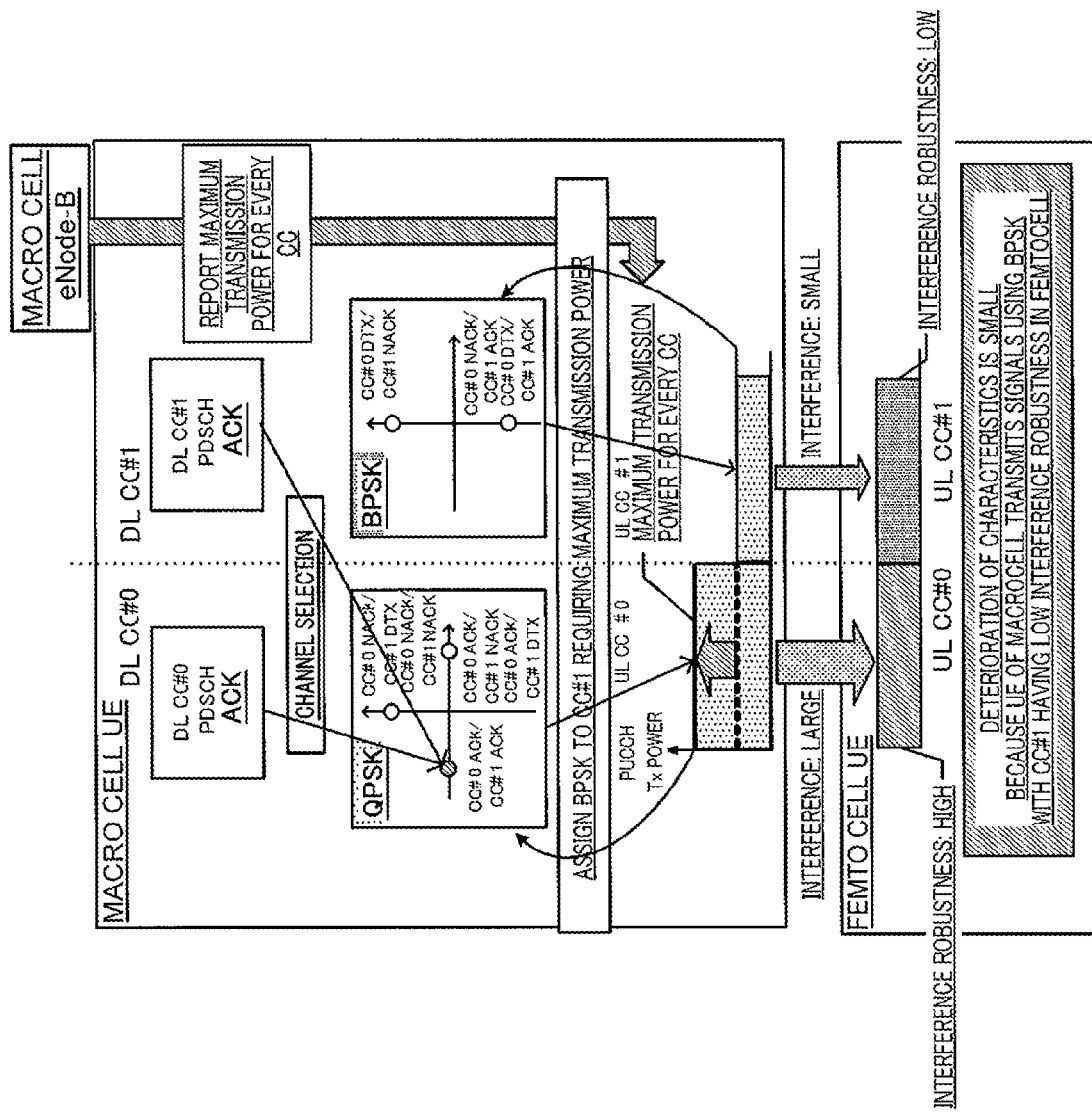
FIG. 9 shows operations of a base station and a terminal according to Embodiment 2 of the present invention.

Base station 100 of Embodiment 2 reports to terminal 200 the information about the maximum transmission power for every CC. This maximum transmission power is controlled by base station 100 according to the allowable interference power set for neighboring cells. That is, as shown in FIG. 9, the maximum transmission power for an uplink component carrier of the macrocell that corresponds to the uplink component carrier of the femtocell with high interference robustness is set greater than the maximum transmission power for an uplink component carrier of the macrocell that corresponds to the uplink component carrier of that femtocell with low interference robustness, the femtocell neighboring to the macrocell.

Therefore, comparison between the maximum transmission powers for respective uplink component carriers that are reported from base station 100 enables terminal 200 to recognize the relative relationships about interference robustness among uplink component carriers in the femtocell.

Accordingly, in terminal 200 of Embodiment 2, control section 217 obtains the information about the maximum transmission power for every uplink component carrier that is contained in an downlink control channel. Here, the values of the maximum transmission powers for respective uplink component carriers indicate which one of uplink component carriers has lower or higher interference robustness than other uplink component carriers in a femtocell. Thus, control section 217 changes the combination rule of an uplink component carrier and constellation points (i.e. transmission rule of the response signal) based on the maximum transmission power for every uplink component carrier, the uplink component carrier and the constellation points being used to transmit a response signal as a feedback.

Specifically, as shown in FIG. 10, in the case where the maximum transmission power for CC#0 is greater than that for CC#1 (i.e. interference robustness is higher in uplink CC#0 than in uplink CC#1 in femtocell), control section 217 assigns the first constellation to uplink CC#0 and the second constellation to uplink CC#1.

On the other hand, in the ease where the maximum transmission power for CC#0 is smaller than that for CC#1 (i.e. interference robustness is lower in uplink CC#0 than in uplink CC#1 in femtocell), control section 217 assigns the first constellation to uplink CC#1 and the second constellation to uplink CC#0. Here, the first constellation and the second constellation are identical to those described in Embodiment 1.

[Embodiment 3]

Embodiment 3 employs the same configuration as Embodiment 1 in that a terminal changes the transmission rule of a response signal based on information reported from a base station. According to Embodiment 3, a base station changes the above combination rule based on information about power head room (PHR) for every uplink component carrier of a macrocell, and a terminal changes the transmission rule of a response signal based on the information about power head room (PHR) for every uplink component carrier of the macrocell, the information about power head room being known by the terminal. That is, according to Embodiment 3, the base station does not need to transmit information about the above combination rule unlike Embodiment 1, For this reason, it is not necessary to transmit additional signaling to the signaling required for the LTE system.

The basic configurations of a base station and terminals according to Embodiment 3, which are identical to those of Embodiment 1, will be described with reference to FIGS. 5 and 6.

Figure 11:
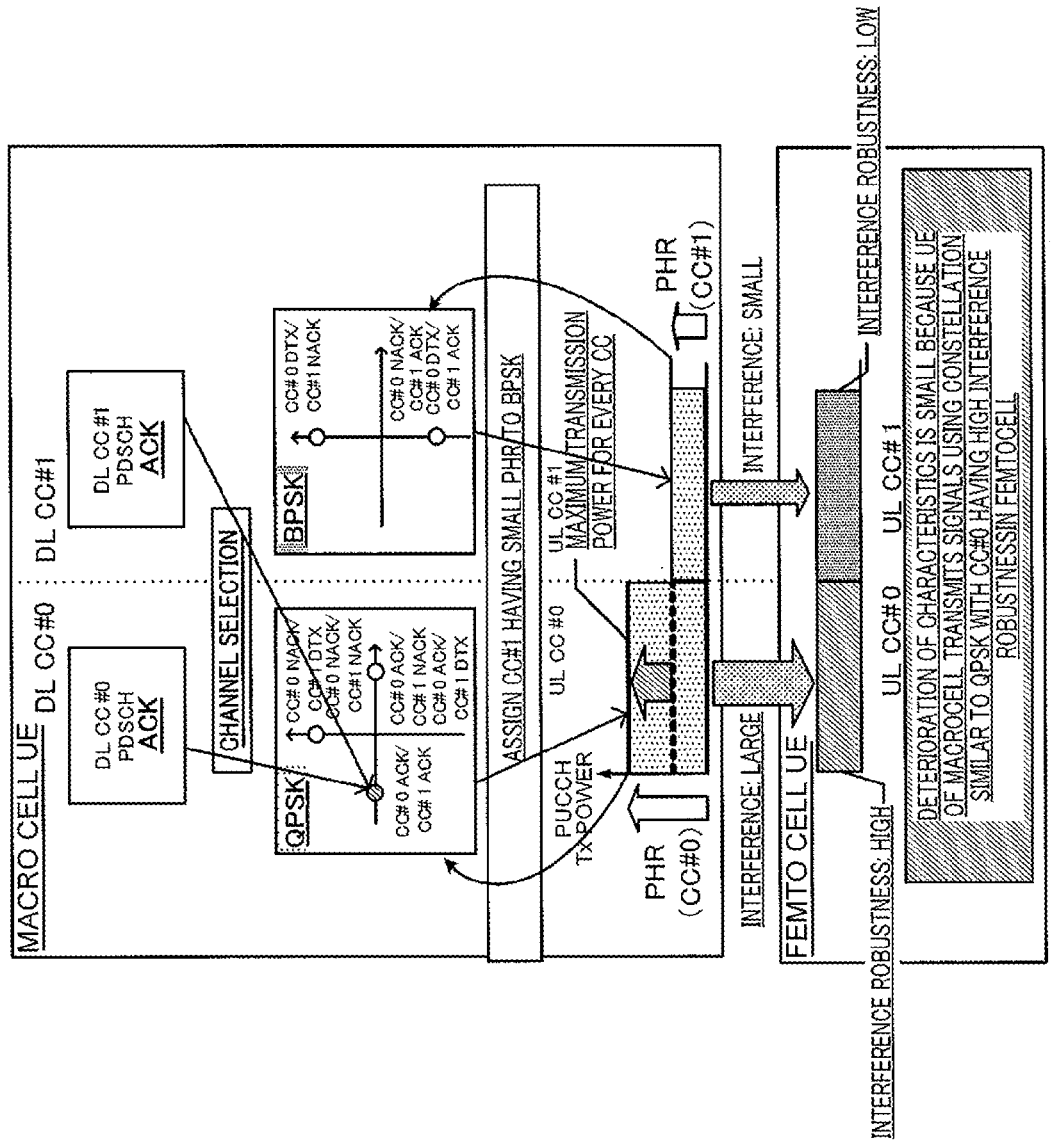
FIG. 11 shows operations of a base station and a terminal according to Embodiment 3 of the present invention.

Base station 200 of Embodiment 3 reports to terminal 100 the information about power head room (PHR) for every CC. This information about power head room indicates a value obtained by subtracting current transmission power from the maximum transmission power for every CC that has been reported from base station 100, and is used to report the allowable amount of transmission power to be amplified. That is, as shown in FIG. 11, the power head room for an uplink component carrier of the macrocell that overlaps the uplink component carrier of the femtocell with high interference robustness, is set greater than the power head room for an uplink component carrier of the macrocell that overlaps the uplink component carrier of the femtocell with low interference robustness, the femtocell neighboring to the macrocell.

Specifically, as shown in FIG. 12, in the case where the power head room for CC#0 is greater than that for CC#1 (i.e. interference robustness is higher in uplink CC#0 than in uplink CC#1 in a femtocell), response scheme control section 101 in base station 100 assigns the first constellation to uplink CC#0 and the second constellation to uplink CC#1.

On the other hand, as shown in FIG. 12, in the ease where the power head room for CC#0 is smaller than that for CC#1 (i.e. interference robustness is lower in uplink CC#0 than in uplink CC#1. in a femtocell), response scheme control section 101 assigns the first constellation to uplink CC#1 and assigns the second constellation to uplink CC#0. Here, the first constellation and the second constellation are identical to those described in Embodiment 1.

Terminal 200 of Embodiment 3 may change the transmission rule of a response signal based on the information about the maximum transmission power for every uplink component carrier of a macrocell as with Embodiment 2, and may change the transmission rule of a response signal based on the information about the power head room (PHR) for every CC that is to be transmitted to base station 100 as shown in FIG. 12.

[Embodiment 4]

According to Embodiment 4, in the transmission rule of a response signal that is used by a terminal to transmit a response signal, the probability that constellations corresponding to respective uplink component carriers are used is equalized. By this means, it is possible to prevent a problem from arising in the case where the probability that a constellation corresponding to certain uplink component carrier is used extremely increases so that the uplink component carrier corresponds to an uplink component carrier of a femtocell with low interference robustness.

Figure 13:
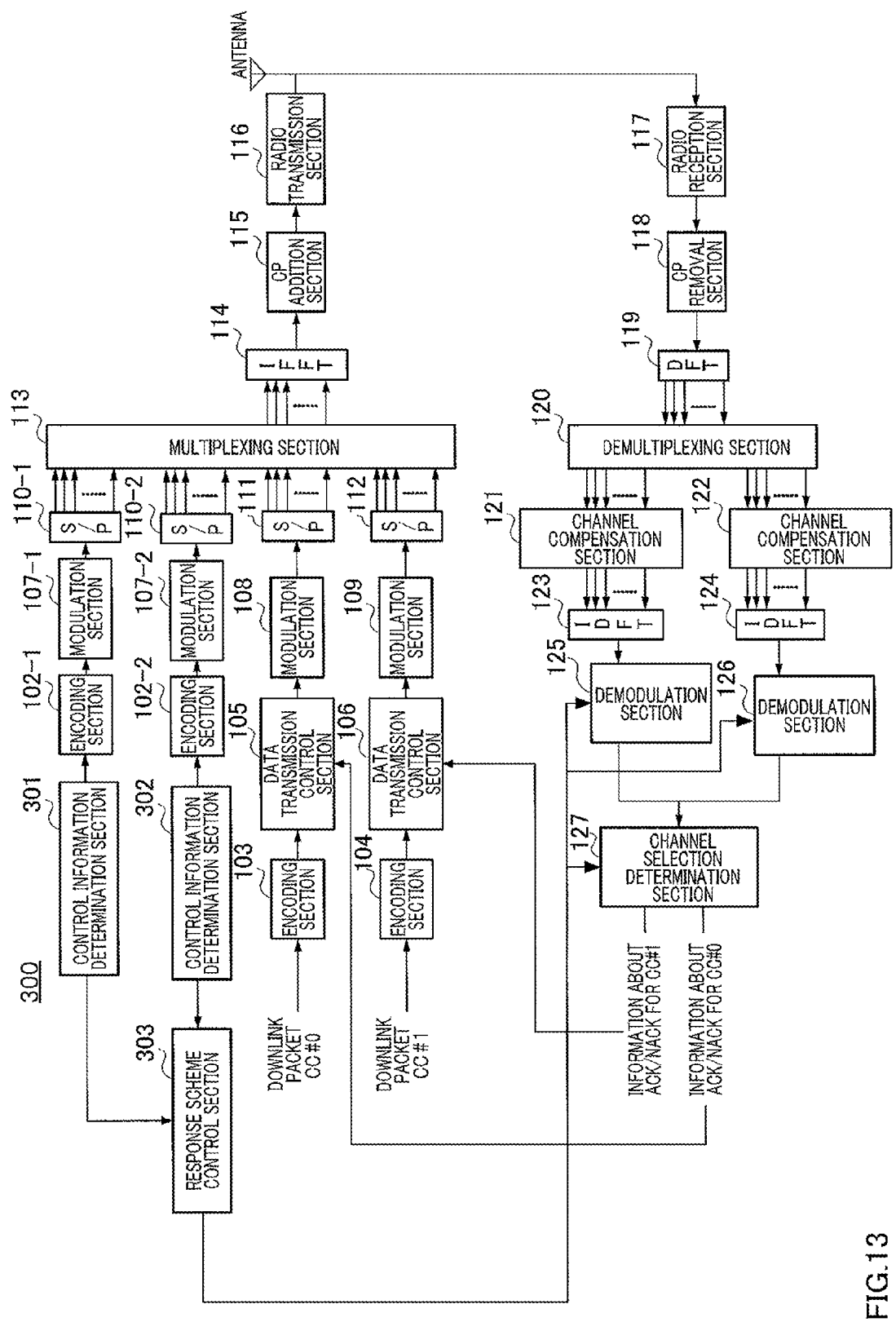
FIG. 13 is a block diagram showing a configuration of a base station according to Embodiment 4 of the present invention.

FIG. 13 is a block diagram showing a configuration of base station 300 according to Embodiment 4. With reference to FIG. 13, base station 300 includes control information determination sections 301 and 302 and response scheme control section 303.

Control information determination sections 301 and 302 determine control information to be transmit in a downlink control channel. The control information includes information related to the error rate of a downlink data channel for every downlink component carrier that is transmitted from base station 300. The information related to the error rate of a downlink data channel for every downlink component carrier of base station 300 includes the error rate of a downlink data channel for every downlink component carrier of base station 300, the number of retransmissions of downlink data that is transmitted using a plurality of downlink component carriers of base station 300, and the modulation scheme for a downlink control channel for every downlink component carrier of base station 300.

Control information determination sections 301 and 302 output the determined control information to encoding sections 102-1 and 102-2 and response scheme control section 303.

Control information determination sections 301 and 302 determine control information for CC#0 and CC#1, respectively.

Response scheme control section 303 determines a rule for combination of an uplink component carrier and constellation points that are to be used by terminal 400 (described later) to transmit a response signal as a feedback to downlink data that has been transmitted from base station 300 using a plurality of downlink component carriers. Response scheme control section 303 determines the above combination rule based on the control information received from control information determination sections 301 and 302.

Figure 14:
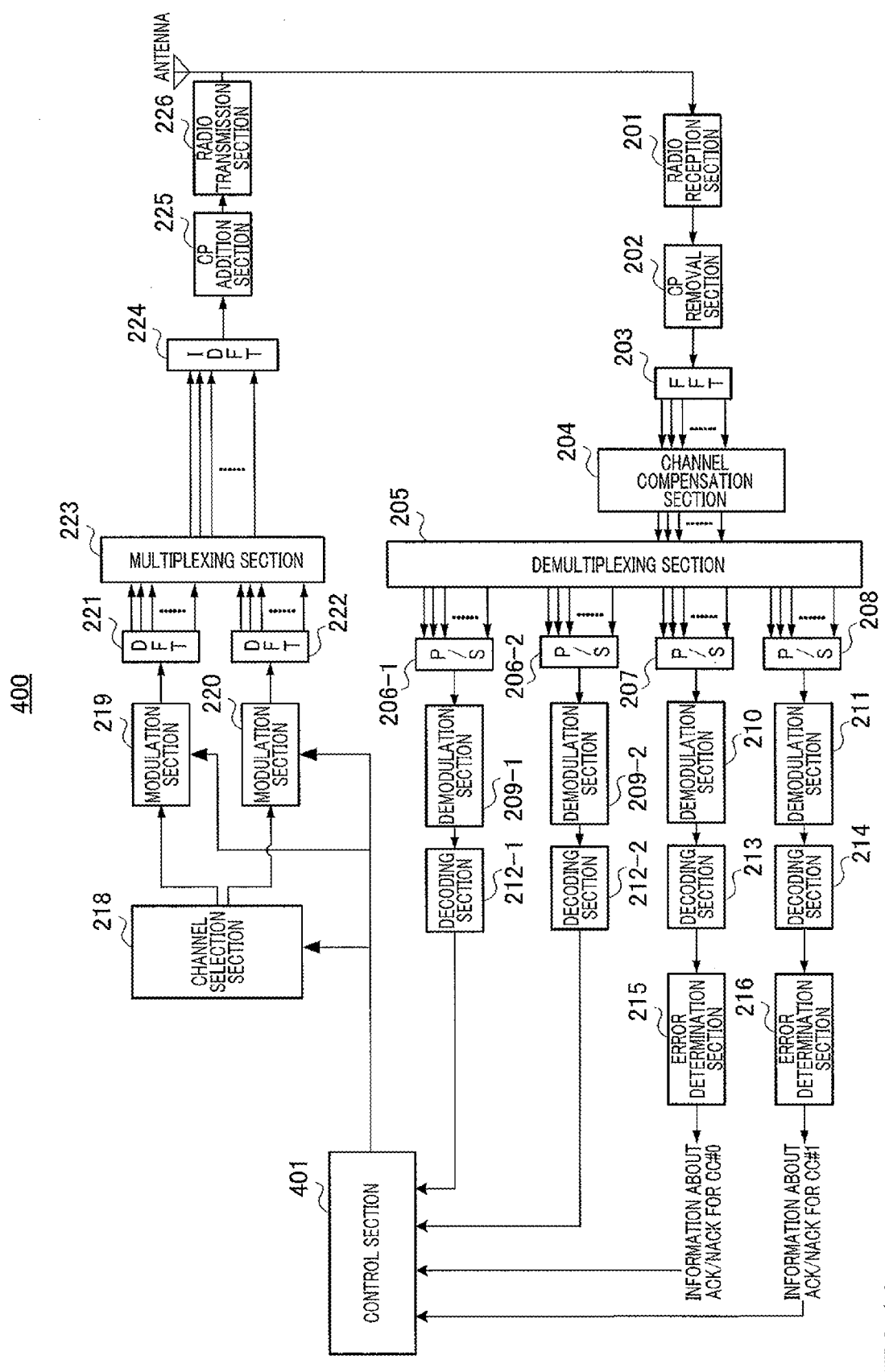
FIG. 14 is a block diagram showing a configuration of a terminal according to Embodiment 4 of the present invention.

FIG. 14 is a block diagram showing a configuration of terminal 400 according to Embodiment 4. With reference to FIG. 14, terminal 400 includes control section 401.

Control section 401 controls transmission of a response signal based on the information related to the error rate of a downlink data channel for every downlink component carrier that is transmitted from base station 300. That is, control section 401 changes the combination rule of an uplink component carrier and constellation points that are used to transmit a response signal as a feedback based on the information related to the error rate of a downlink data channel for every downlink component carrier that is transmitted from base station 300.

Figure 15:
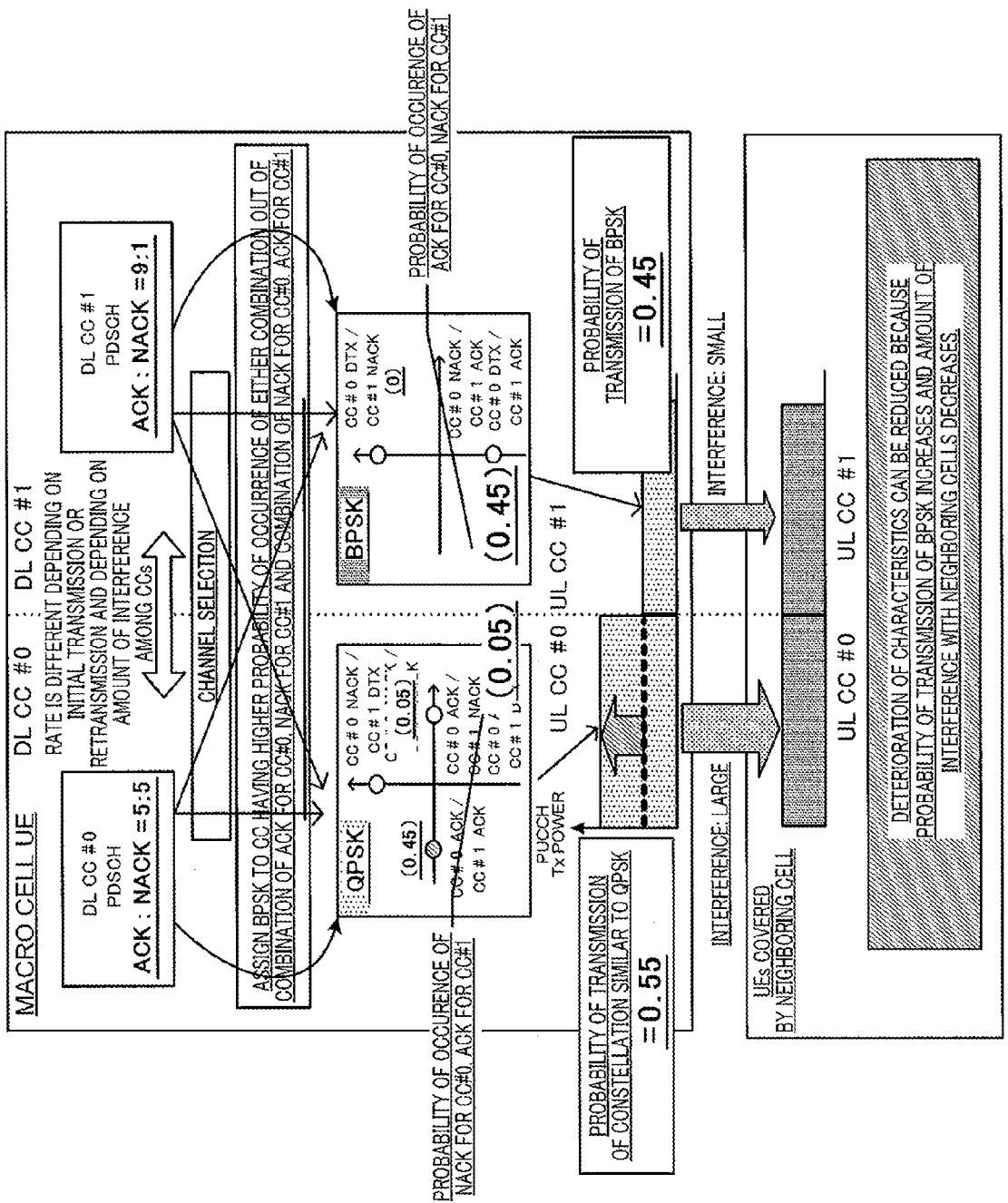
FIG. 15 shows operations of a base station and a terminal.

According to the above changed combination rule, with reference to FIG. 15, in the case where downlink data is transmitted using two downlink component carriers of the macrocell, and among two uplink component carriers of the macrocell, the error rate for the first component carrier (CC#0) of the macrocell is greater than that for the second component carrier (CC#1) of the macrocell, the number of candidate constellation points contained in the first constellation associated with the first component carrier of the macrocell is greater than that contained in the second constellation associated with the second component carrier of the macrocell.

Furthermore, the pattern about successful reception indicating that downlink packets of all component carriers have been successfully received is associated with any one of the constellation points contained in the first constellation. Here, the following assumption is made: the pattern about successful reception indicating that downlink data transmitted using the first component carrier has been successfully received and downlink data transmitted using the second component carrier has not been received is associated with any one of the constellation points contained in a constellation corresponding to the first component carrier, and on the other hand, the pattern about successful reception indicating that downlink data transmitted using the first component carrier has not been received and downlink data transmitted using the second component carrier has been successfully received is associated with any one of the constellation points contained in a constellation corresponding to the second component carrier.

As described above, the information related to the error rate of a downlink data channel for every downlink component carrier that is transmitted from base station 300 includes the error rate of a downlink data channel for every downlink component carrier of base station 300, the number of retransmissions of downlink data transmitted using a plurality of downlink component carriers of base station 300, and the modulation scheme for a downlink control channel for every downlink component carrier of base station 300.

By using the information about these items, terminal 400 can recognize which one of downlink component carriers has a smaller or greater error rate than other downlink component carriers.

<Number of Retransmissions>

When HARQ is employed, generally, the modulation scheme and the coding rate of a data channel at the initial transmission is set in such a way that the packet error rate is approximately 0.1 (ACK=0.9, NACK=0.1). The packet error rate of the data channel at the retransmission improves compared to the previous transmission because the reception quality improves as packets are retransmitted. Hence, it is possible to judge which one of downlink component carriers has a smaller or greater error rate than other downlink component carriers based on the number of retransmissions for every downlink component carrier.

Hence, as shown in, for example, FIG. 16, control section 401 associates a constellation having a greater number of constellation points with CC#0 than the constellation to be associated with CC#1 in the case where the number of retransmissions using CC#0 is smaller than that using CC#1. On the other hand, control section 401 associates a constellation having a greater number of constellation points with CC#1 than the constellation to be associated with CC#0 in the case where the number of retransmissions using CC#0 is greater than that using CC#1.

In the above explanation, which one of downlink component carriers has a smaller or greater error rate than other downlink component carriers is determined based on the number of retransmissions for every downlink component carrier, but may be determined based on the total number of transmissions (the initial transmission+the number of retransmissions).

Furthermore, in the system in which data is retransmitted once at the greatest, it is possible to determine whether or not the transmission is the initial transmission or retransmission.

<MCS Level>

In the downlink control channel, control information for demodulating the downlink data channel is reported. In the case where the interference power among cells is large, the MCS for the control channel is set to the modulation scheme (or the coding rate) with a low transmission rate. in the case where the interference power among cells is large, the packet error rate tends to increase. Hence, it is possible to judge which one of downlink component carriers has a smaller or greater error rate than other downlink component carriers based on the modulation and coding scheme (MCS) level of control channel for every downlink component carrier (i.e. the modulation scheme and the encoding scheme indicated by downlink control channel for every downlink component carrier).

For this reason, as shown in, for example, FIG. 17, control section 401 associates a constellation having a greater number of constellation points with CC#0 than the constellation to be associated with CC#1. in the case where the .MCS level for CC#0 is lower than the MCS level for CC#1. On the other hand, control section 401 associates a constellation having a greater number of constellation points with CC#1 than the constellation to be associated with CC#0 in the case where the MCS level for CC#0 is greater than the MCS level for CC#1.

In the LTE specification, information about the number of domains in which control channels are multiplexed (i.e. the number of CCEs) is used for information about the MCS level for a control channel (see FIG. 18). This indicates that data is transmitted using the modulation scheme or the coding rate having a lower MCS level as the number of CCEs is greater.

[Embodiment 5]

According to Embodiment 5, in the transmission rule of a response signal that is used by a terminal to transmit a response signal, constellation A and constellation B containing a smaller number of constellation points than constellation A are provided. In addition, the error rate for the component carrier associated with constellation B is smaller than that for the component carrier associated with constellation A. Furthermore, the total of the probabilities that constellation points contained in constellation B are used is greater than the total of the probabilities that constellation points contained in constellation A are used. The basic configurations of a base station and terminals according to Embodiment 5 are identical to those of Embodiment 4.

In terminal 400 of Embodiment 5, control section 401 controls transmission of a response signal based on information related to the error rate of a downlink data channel for every downlink component carrier that is transmitted from base station 300. That is, control section 401 changes the combination rule of an uplink component carrier and constellation points based on the information related to the error rate of a downlink data channel for every downlink component carrier that is transmitted from base station 300, the uplink component carrier and the constellation points being used to transmit a response signal as a feedback.

Figure 19:
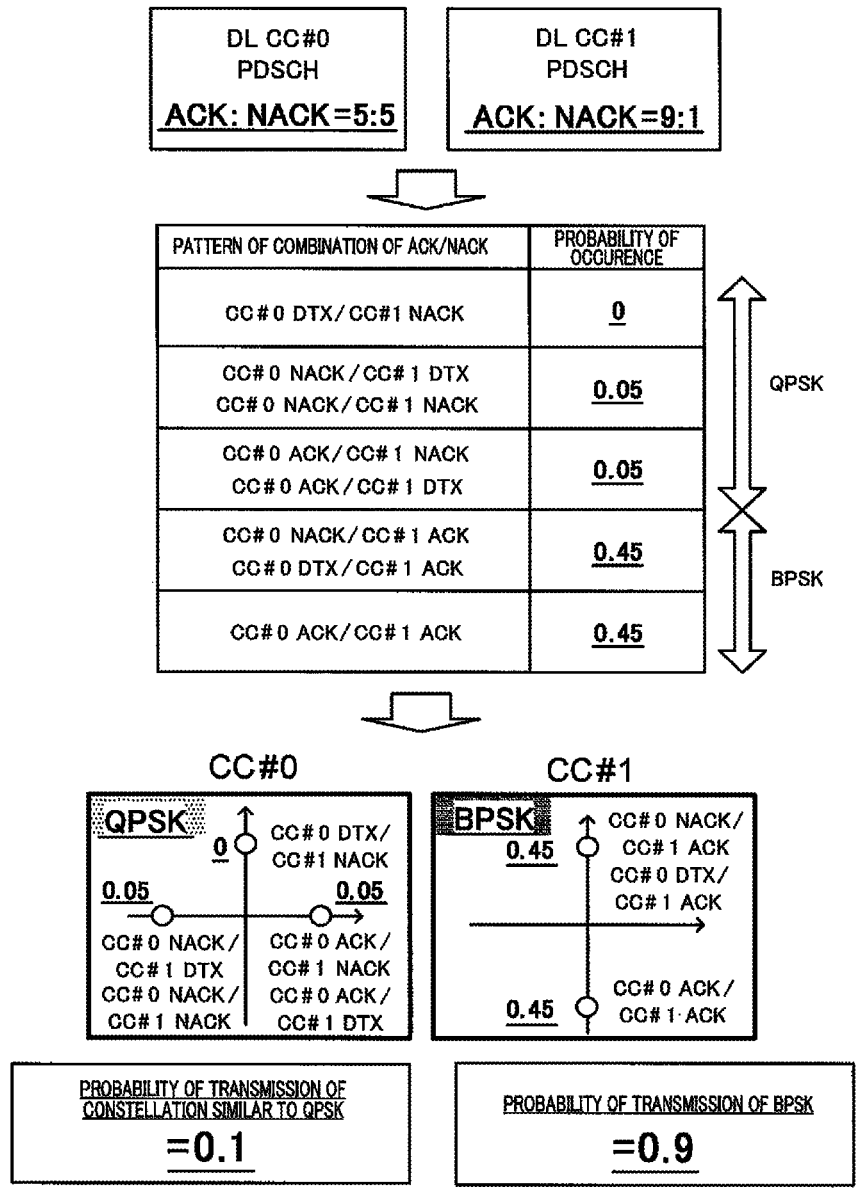
FIG. 19 shows operations of a base station and a terminal according to Embodiment 5 of the present invention.

According to the above changed combination rule, as shown in FIG. 19, the number of candidate constellation points contained in the first constellation associated with the first component carrier of the macrocell is greater than that contained in the second constellation associated with the second component carrier of the macrocell in the case where downlink data is transmitted using two downlink component carriers of the macrocell, and among two downlink component carriers of the macrocell, the error rate for the first component carrier (CM) of the macrocell is greater than that for the second component carrier (CC#1) of the macrocell.

Furthermore, a constellation point contained in the second constellation is associated with a pattern about successful reception in order of the pattern that is more highly likely to occur. That is, with reference to FIG. 19, the patterns about successful reception are highly likely to occur in which downlink data is successfully received using CC#0 and CC#1 and in which downlink data is not received using CC#0 but downlink data is successfully received using CC#1. For this reason, these two patterns are associated with any one of the constellation points of the second constellation (constellation of BPSK in FIG. 19). With reference to FIG. 19, for easier calculation, the probability of failure in receiving a PDCCH (i.e. DTX) is 0. Accordingly, assignment of the pattern about successful reception that is highly likely to occur to the constellation of BPSK increases the probability of BPSK being used. By so doing, the amount of interference to neighboring cells can be reduced.

[Other Embodiments]

(1) According to Embodiment 1, base station 100 reports to terminal 200 information about the combination pattern of a CC and a constellation, but the present invention is not limited to this configuration. Identification information of CC that is used for the pattern about successful reception in which downlink data is successfully received using all CCs may be reported. This is because only the pattern about successful reception in which downlink data is successfully received using all CCs can be transmitted using any CC.

Alternatively, the number of constellation points for each of the constellations may be reported.

Furthermore, base station 100 may report these pieces of information to every terminal 200 or terminals 200 in the entire cell.

Furthermore, only terminals 200 located near a femtocell may follow the order of the above reporting, while terminals 200 other than such terminals 200 may transmit a response signal in a predetermined random CC using the constellation corresponding to QPSK. This prevents all terminals 200 subject to channel selection from transmitting a response signal in the same CC using the constellation corresponding to QPSK, thus preventing congestion of the PUCCH of that component carrier in the case where a base station reports information to terminals 200 in the entire cell.

Furthermore, using bundling (logical product of ACK/NACK) instead of channel selection also reduces interference to the femtocell by reporting a CC for transmitting a PUCCH for bundling.

(2) According to Embodiment 1, two component carriers are used, but the present invention is not limited to this configuration. Even when three or more component carriers are used, the same embodiment as Embodiment 1 can be performed by reporting the number of constellation points for each of the constellations.

(3) According to Embodiment 4, both base station 300 and terminal 400 independently judge which component carrier has a smaller or greater error rate of a downlink data channel than other component carriers. The present invention, however, is not limited to this configuration. Base station 300 may make this judgment and report the result of the judgment to terminal 400 by including the result in control information.

(4) According to Embodiment 4, for example, even in the case where an ACK and a NACK occur at the same probability, the combination of constellation points of ACK/ACK in the constellation similar to QPSK is highly likely to occur. For this reason, to assign each terminal 400 a different CC to be used for transmission using the constellation corresponding to the constellation similar to QPSK, it is effective to make base station 300 report to terminal 400 the CC to be used for transmission using the constellation corresponding to the constellation similar to QPSK.

(5) The maximum transmission power (Pmax) in Embodiment 2 is a maximum value at which terminal 200 can perform transmission. The present invention, however, is not limited to this configuration. Instead, base station 100 and terminal 200 share information on transmission power for every downlink CC of base station 100, and then, terminal 200 may transmit a response signal using the constellation corresponding to the constellation similar to QPSK in an uplink CC corresponding to a downlink CC of large transmission power.

(6) According to Embodiments 1 to 3, the constellation used for channel selection of a PUCCH for a terminal communicating with a macrocell base station neighboring a femtocell has been described. The present invention, however, is not limited to this configuration. Specifically, every base station may compare the relative cell sizes of neighboring cells and may take into consideration the relative relationship about the significance of interference of the neighboring cells to judge the constellation for channel selection of a PUCCH. That is, this configuration makes it possible to select the optimum constellation by taking into consideration interference robustness against interference power among cells even in the ease where a femtocell and a macrocell are not clearly defined. Furthermore, regarding a terminal communicating with a femtocell base station neighboring a macrocell, the reception characteristics for channel selection can be improved by making the femtocell base station report to such a terminal the constellation for channel selection of a PUCCH. The number of candidate constellation points contained in the constellation in this case is greater for the constellation associated with a component. carrier having high interference robustness in the femtocell than for the second constellation associated with the second component carrier having low interference robustness in the femtocell.

(7) Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Furthermore, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-018715, filed on Jan. 29, 2010, including the specification, drawings and abstract, is incorporated herein by reference in its entirety.

INDUSTRIAL APPLICABILITY

The base station, terminal, retransmission control method, and response method according to the present invention are effective for preventing deterioration of reception characteristics of neighboring cells in the case where carrier aggregation and channel selection are employed.

REFERENCE SIGNS LIST

100, 300 base station
101, 303 response scheme control section
102, 103, 104 encoding section
105, 106 data transmission control section
107, 108, 109, 219, 220 modulation section
110, 111, 112 serial-to-parallel conversion section
113, 223 multiplexing section
114 IFFT section
115, 225 CP addition section
116, 226 radio transmission section
117, 201 radio reception section
118, 202 CP removal section
119, 221, 222 DFT section
120, 205 demultiplexing section
121, 122, 204 channel compensation section
125, 126, 209, 210, 211 demodulation section
127 channel selection determination section
200, 400 terminal
203 FFT section
206, 207, 208 parallel-to-serial conversion section
212, 213, 214 decoding section
215 error determination section
216 determination section
217, 401 control section
218 channel selection section
224 IDFT section
301, 302 control information determination section

The invention claimed is:

1. A base station comprising:
a controller configured to determine a rule for associating a combination of a component carrier and constellation points with patterns about successful reception of each of downlink data transmitted using a plurality of component carriers in a channel selection, based on a relative relationship about a parameter related to interference robustness among the plurality of component carriers in a plurality of cells, the component carrier and the constellation points being used by a terminal to feed back a response signal for downlink data transmitted using the plurality of component carriers, the channel selection being performed such that the response signal is fed back by changing the combination of the component carrier and the constellation points according to a pattern about successful reception of each of the downlink data transmitted using the plurality of component carriers;

a receiver configured to receive the response signal; and an identification section configured to identify the pattern about successful reception from a combination of the component carrier and the constellation points that are used to feed back the response signal, based on the rule, wherein according to the rule, in the case where the downlink data is transmitted using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

2. The base station according to claim 1, wherein the parameter related to the interference robustness is one of interference robustness for each of the plurality of component carriers, maximum transmission power for each of the plurality of component carriers, a power head room value for each of the plurality of component carriers, an error rate of a downlink data channel for each of the plurality of component carriers, the number of retransmissions of the downlink data transmitted using the plurality of component carriers, and a modulation scheme or an encoding scheme that is indicated by a downlink control channel of each of the plurality of component carriers.

3. The base station according to claim 1, wherein according to the rule, in the case where the downlink data is transmitted using two components carriers among the plurality of component carriers and a first component carrier has higher interference robustness than a second component carrier of the two component carriers in a first cell among the plurality of cells, the number of the constellation points contained in a constellation associated with the first component carrier of a second cell different from the first cell is greater than the number of the constellation points contained in a constellation associated with the second component carrier of the second cell.

4. A base station comprising:

a controller configured to determine a rule for associating a combination of a component carrier and constellation points with patterns about successful reception of each of downlink data transmitted using a plurality of component carriers in a channel selection, based on a relative relationship about a parameter related to interference robustness among the plurality of component carriers in a plurality of cells, the component carrier and the constellation points being used by a terminal to feed back a response signal for downlink data transmitted using the plurality of component carriers, the channel selection being performed such that the response signal is fed back by changing the combination of the component carrier and the constellation points according to a pattern about successful reception of each of the downlink data transmitted using the plurality of component carriers; and a transmitter configured to transmit the downlink data using the plurality of component carriers and information indicating the rule, to the terminal, wherein according to the rule, in the case where the downlink data is transmitted using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

5. The base station according to claim 4, wherein according to the rule, in the case where the downlink data is transmitted using two component carriers among the plurality of component carriers and a first component carrier has higher interference robustness than a second component carrier of the two component carriers in a first cell among the plurality of cells, the number of constellation points contained in a constellation associated with the first component carrier of a second cell different from the first cell is greater than the number of constellation points contained in a constellation associated with the second component carrier of the second cell.

6. A terminal comprising:

a receiver configured to receive downlink data using a plurality of component carriers;

a controller configured to determine a rule for associating a combination of a component carrier and constellation points with patterns about successful reception of each of downlink data transmitted using a plurality of component carriers in a channel selection, the component carrier and the constellation points being used to feed back a response signal for the downlink data transmitted using the plurality of component carriers, the channel selection being performed such that the response signal is fed back by changing the combination of the component carrier and the constellation points according to a pattern about successful reception of each of the downlink data transmitted using the plurality of component carriers; and a transmitter configured to transmit the response signal to a base station based on the rule;

wherein the controller determines the rule based on information indicating the rule or based on a relative relationship about a parameter related to interference robustness among the plurality of component carriers in a plurality of cells, the information indicating the rule being determined by the base station based on the relative relationship about the interference robustness among the plurality of component carriers, wherein according to the rule, in the case where the downlink data is received using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

7. The terminal according to claim 6, wherein the parameter related to the interference robustness is one of interference robustness for each of the plurality of component carriers, maximum transmission power for each of the plurality of component carriers, a power head room value for each of the plurality of component carriers, an error rate of a downlink data channel for each of the plurality of component carriers, the number of retransmissions of the downlink data transmitted using the plurality of component carriers, and a modulation scheme or an encoding scheme that is indicated by a downlink control channel of each of the plurality of component carriers.

8. The terminal according to claim 6, wherein according to the rule, in the case where the downlink data is received using two component carriers among the plurality of component carriers and a first component carrier has higher interference robustness than a second component carrier of the two component carriers in a first cell among the plurality of cells, the number of the constellation points contained in a constellation associated with the first component carrier of a second cell is greater than the number of the constellation points contained in a constellation associated with the second component carrier of the second cell, the second cell being different from the first cell.

9. A retransmission control method comprising:

determining a rule for associating a combination of a component carrier and constellation points with patterns about successful reception of each of downlink data transmitted using a plurality of component carriers in a channel selection, based on a relative relationship about a parameter related to interference robustness among the plurality of component carriers in a plurality of cells, the component carrier and the constellation points being used by a terminal to feed back a response signal for downlink data transmitted using the component carriers, the channel selection being performed such that the response signal is fed back by changing the combination of the component carrier and the constellation points according to a pattern about successful reception of each of the downlink data transmitted using the plurality of component carriers;

receiving the response signal; and identifying the pattern about successful reception from a combination of the component carrier and the constellation points that are used to feed back the response signal, based on the rule, wherein according to the rule, in the case where the downlink data is received using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

10. A retransmission control method comprising:

determining a rule for an association of a combination of a component carrier and constellation points with patterns about successful reception of each of downlink data transmitted using a plurality of component carriers in a channel selection, based on a relative relationship about a parameter related to interference robustness among the plurality of component carriers in a plurality of cells, the component carrier and the constellation points being used by a terminal to feed back a response signal for downlink data transmitted using the plurality of component carriers, the channel selection being performed such that the response signal is fed back by changing the combination of the component carrier and the constellation points according to a pattern about successful reception of each of the downlink data transmitted using the plurality of component carriers; and transmitting the downlink data using the plurality of component carriers and information indicating the rule, to a terminal, wherein according to the rule, in the case where the downlink data is received using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

11. A response method comprising:

determining a rule for an association of a combination of a component carrier and constellation points with patterns about successful reception of each of downlink data transmitted using a plurality of component carriers in a channel selection, the component carrier and the constellation points being used to feed back a response signal for downlink data transmitted using a plurality of component carriers, the channel selection being performed such that the response signal is fed back by changing the combination of the component carrier and the constellation points according to a pattern about successful reception of each of the downlink data transmitted using the plurality of component carriers; and transmitting the response signal to a base station based on the rule;

wherein the rule is determined based on information indicating the rule or based on a relative relationship about a parameter related to interference robustness among the plurality of component carriers in a plurality of cells, the information indicating the rule being determined by the base station based on the relative relationship about the interference robustness among the plurality of component carriers, wherein according to the rule, in the case where the downlink data is received using two component carriers among the plurality of component carriers and a first component carrier has higher interference robustness than a second component carrier of the two component carriers in a first cell among the plurality of cells, and a total of probabilities that the constellation point contained in a constellation associated with the first component carrier of a second cell different from the first cell is used is higher than a total of probabilities that the constellation point contained in a constellation associated with the second component carrier of the second cell is used.

* * * * *